(12) United States Patent
Thrue et al.

(10) Patent No.: US 8,198,966 B2
(45) Date of Patent: Jun. 12, 2012

(54) DOCKING STATION FOR A TRANSFORMER AND METHOD FOR INSTALLATION OF A TRANSFORMER STATION

(75) Inventors: Carsten Thrue, Braedstrup (DK); Subbiathever Dukkaiappan, Nashik (IN); Sameer Dahibhate, Nashik (IN)

(73) Assignee: ABB Technology AG, Zurich (CH)

( * ) Notice: Subject to any disclaimer, the term of this patent is extended or adjusted under 35 U.S.C. 154(b) by 985 days.

(21) Appl. No.: 12/048,009

(22) Filed: Mar. 13, 2008

(65) Prior Publication Data

US 2008/0222969 A1   Sep. 18, 2008

(30) Foreign Application Priority Data

Mar. 16, 2007  (EP) ...................................... 07104350

(51) Int. Cl.
*H01F 27/02* (2006.01)
*H01F 27/04* (2006.01)
*H01F 27/06* (2006.01)
*E04F 19/00* (2006.01)
*E04B 1/00* (2006.01)

(52) U.S. Cl. ............ 336/90; 336/107; 336/65; 336/192; 52/27; 52/741

(58) Field of Classification Search .................. None
See application file for complete search history.

(56) References Cited

U.S. PATENT DOCUMENTS

| | | | | |
|---|---|---|---|---|
| 2,392,551 A | * | 1/1946 | Roe ................................ | 52/586.2 |
| 2,963,121 A | * | 12/1960 | Felver .............................. | 52/73 |
| 3,014,158 A | * | 12/1961 | Nelson et al. .................... | 361/41 |
| 3,125,735 A | * | 3/1964 | Twomey ........................... | 336/92 |
| 3,530,418 A | * | 9/1970 | Keogh et al. .................... | 337/194 |
| 3,621,339 A | * | 11/1971 | Hodgson ......................... | 361/678 |
| 3,640,039 A | * | 2/1972 | McKee et al. .................... | 52/281 |
| 3,759,044 A | * | 9/1973 | Caron et al. .................... | 405/267 |
| 3,925,679 A | * | 12/1975 | Berman et al. ................. | 290/1 R |
| 4,146,112 A | * | 3/1979 | Usry ............................. | 181/202 |
| 4,176,897 A |   | 12/1979 | Cameron | |

(Continued)

FOREIGN PATENT DOCUMENTS

DE        1 901 054 U       9/1964

(Continued)

OTHER PUBLICATIONS

European Search Report.

*Primary Examiner* — Lincoln Donovan
*Assistant Examiner* — Mangtin Lian
(74) *Attorney, Agent, or Firm* — Buchanan Ingersoll & Rooney PC

(57) ABSTRACT

A transformer station is disclosed comprising a foundation plate and a building with a transformer positioned on top of the foundation plate. The foundation plate is provided with a docking station comprising a first electrical connector. The building with the transformer is provided with a corresponding second electrical connector configured for direct mating with the first electrical connector when the building is placed onto the foundation plate. The transformer station is installed by: providing the foundation plate with a docking station having a first electrical connector; providing the building with a corresponding second electrical connector for connection with the first electrical connector; and placing the building onto the foundation plate with the first and second electrical connectors mating to each other.

18 Claims, 14 Drawing Sheets

U.S. PATENT DOCUMENTS

| | | | |
|---|---|---|---|
| 4,569,167 A * | 2/1986 | Staples | 52/92.2 |
| 5,166,861 A * | 11/1992 | Krom | 361/678 |
| 5,509,244 A * | 4/1996 | Bentzon | 52/387 |
| 5,720,141 A * | 2/1998 | Goff | 52/265 |
| 6,215,653 B1 * | 4/2001 | Cochran et al. | 361/602 |
| 6,770,810 B2 * | 8/2004 | Wiebe et al. | 174/50 |
| 2006/0096198 A1 * | 5/2006 | Kmet et al. | 52/234 |
| 2006/0181837 A1 * | 8/2006 | Sun et al. | 361/602 |
| 2009/0213531 A1 * | 8/2009 | Berggren | 361/603 |

FOREIGN PATENT DOCUMENTS

| | | |
|---|---|---|
| DE | 1 665 103 A1 | 11/1971 |
| DE | 27 29 571 A1 | 1/1979 |
| EP | 1 533 877 A1 | 5/2005 |
| FR | 2 635 135 A1 | 2/1990 |
| FR | 2 669 153 A1 | 5/1992 |

* cited by examiner

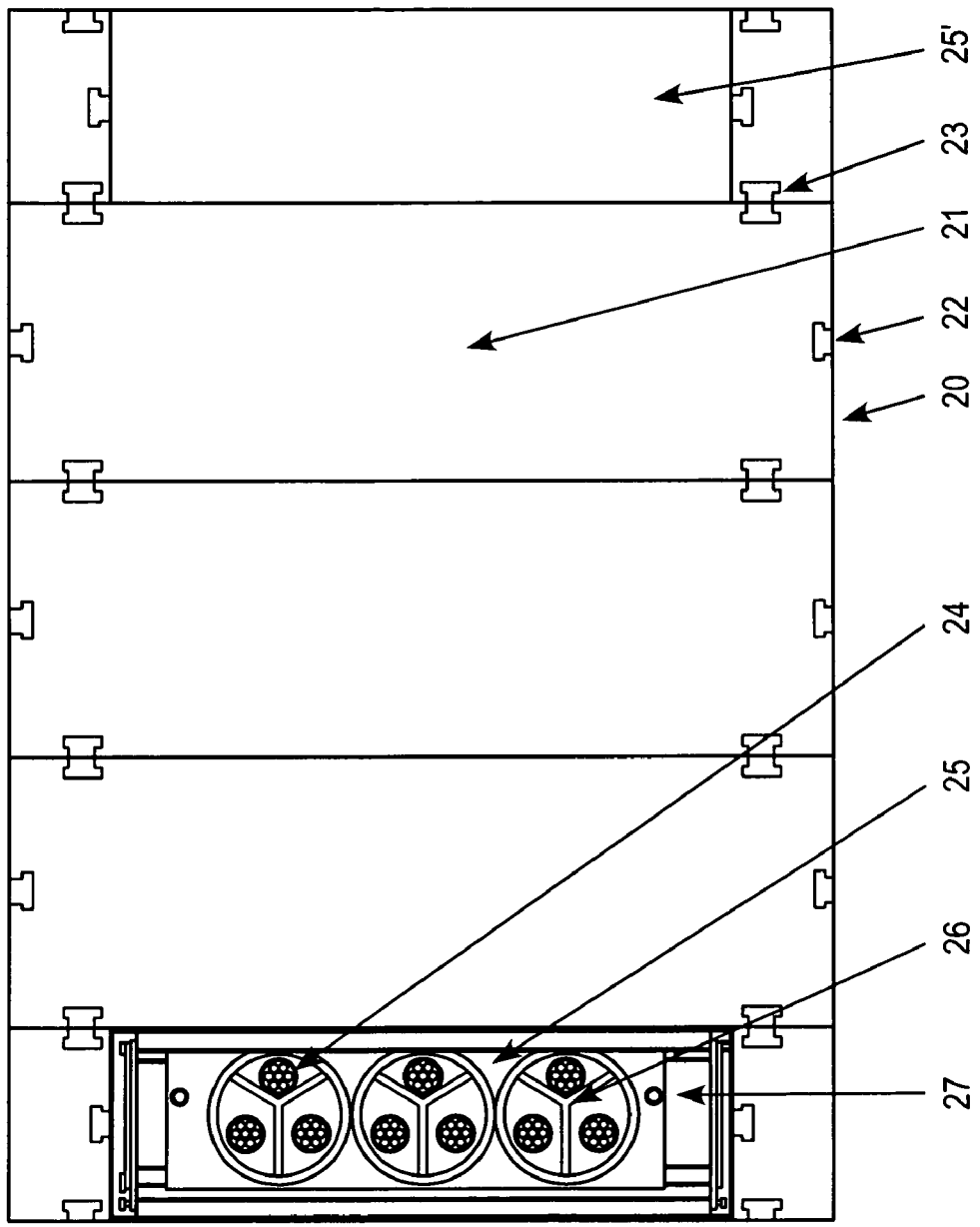

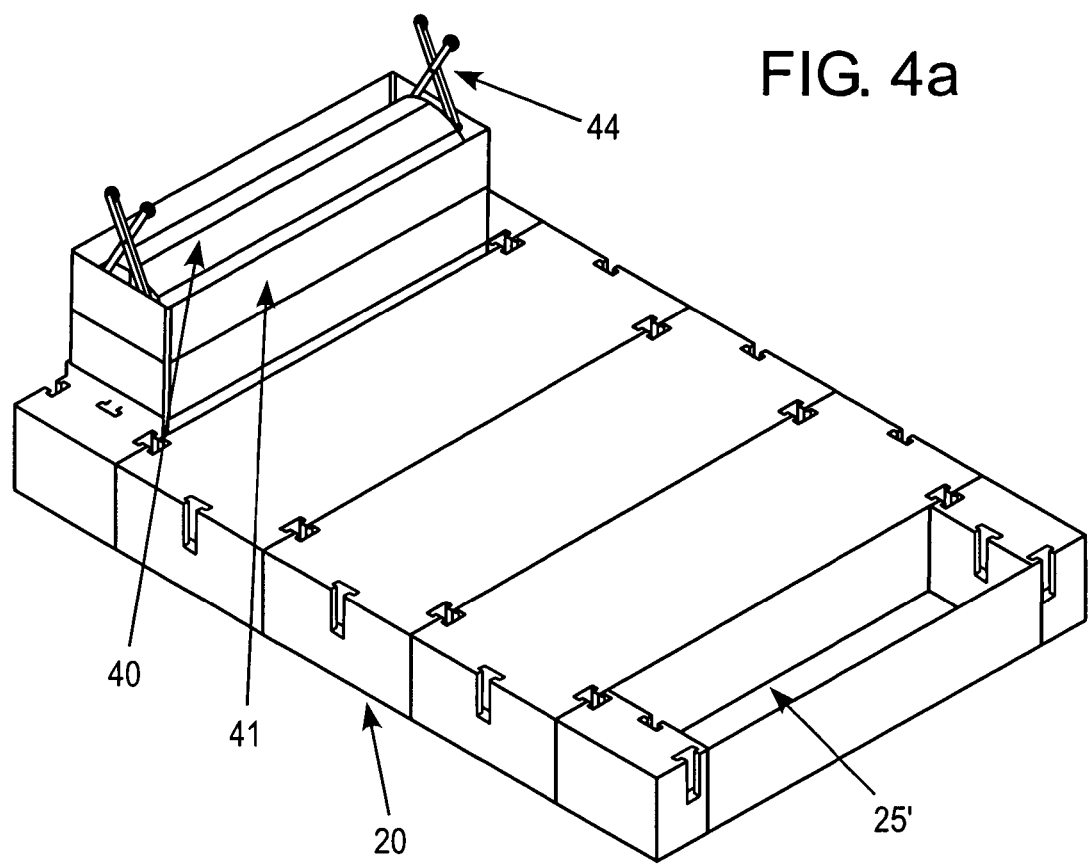

US 8,198,966 B2

DOCKING STATION FOR A TRANSFORMER AND METHOD FOR INSTALLATION OF A TRANSFORMER STATION

RELATED APPLICATION

This application claims priority under 35 U.S.C. §119 to European Patent Application No. 07104350.9 filed in the European Patent Office on 16 Mar. 2007, the entire content of which is hereby incorporated by reference in its entirety.

TECHNICAL FIELD

A method for installation of a transformer station is disclosed, the trans-former station comprising a foundation plate and a building with a transformer, which is suitable to be positioned on top of the foundation plate. A transformer station and a docking station are also disclosed.

BACKGROUND INFORMATION

The term Compact Secondary Substation (CSS) is typically used for trans-former stations in which the power from the main electricity net is transformed from medium voltage (MV), which is in the range 1-50 kV, to low voltage (LV), which is in the range of <1000 Volts. Typical CSS are produced with a concrete foundation and a concrete or metal housing on top of the foundation. Examples of typical prior art CSSs are shown in FIG. 1a and FIG. 1b.

A prior art CSS is typically delivered as a complete building with a foundation plate on which the transformer, the MV electrics and the LV electrics are mounted already and covered by a housing. This entirely equipped building, when delivered, has to be connected to the MV cables and LV—typically coming up from the ground—which are inserted into the housing through trench like openings in both end of the housing. As the cables are stiff and difficult to handle, the connection to the electricity net is a tedious task. In addition, also the production of the various parts forming the final layout of the station is not fully optimized.

It would be desirable to ease the installation phase, and in particular the connection to the electricity net when the transformer is delivered. In addition, it would be also desirable to provide a solution which, while improving the installation phase, will also allow easing the production phase of the various components forming the layout of the station.

SUMMARY

A transformer installation is disclosed which is easier to handle than hitherto, in particular as regard to the mounting on the installation site, as well as to the production phase of the various components.

A method for installation of a transformer station is disclosed, the trans-former station comprising a foundation plate and a building with a transformer which is suitable to be positioned on top of the foundation plate, the method comprising: providing said foundation plate with a docking station having a first electrical connector; providing said building with a corresponding second electrical connector for connection with the first electrical connector; and placing said building onto the foundation plate with said first and second electrical connectors mating to each other.

A transformer station is disclosed comprising a foundation plate and a building with a transformer positioned on top of the foundation plate, wherein said foundation plate is provided with a docking station comprising a first electrical connector, and wherein the building with the transformer is provided with a corresponding second electrical connector configured for mating with the first electrical connector when the building is placed onto the foundation plate.

A docking station for a transformer station is disclosed of the type comprising a foundation plate and a building with a transformer positioned on top of the foundation plate, wherein it comprises a first electrical connector configured for mating with a corresponding second electrical connector of said building with a trans-former when the building is placed onto the foundation plate, the docking station further comprising a shielding mechanism for shielding the first electrical connector when the first connector is not connected to said building.

BRIEF DESCRIPTION OF THE DRAWINGS

The disclosure will be explained in more detail with reference to the drawing, where FIG. 1 a) is a three-dimensional illustration of a prior CSS; and b) is a sketch of the interior of a prior art CSS;

FIG. 2 a) is a perspective view of a modular foundation according to the disclosure; and b) is a top view of the foundation of FIG. 2a;

FIG. 3 a) is a perspective view illustrating a frame of a building for a transformer station according to the disclosure; b) is a top view of the foundation of FIG. 3a;

DETAILED DESCRIPTION

Figure 1A:
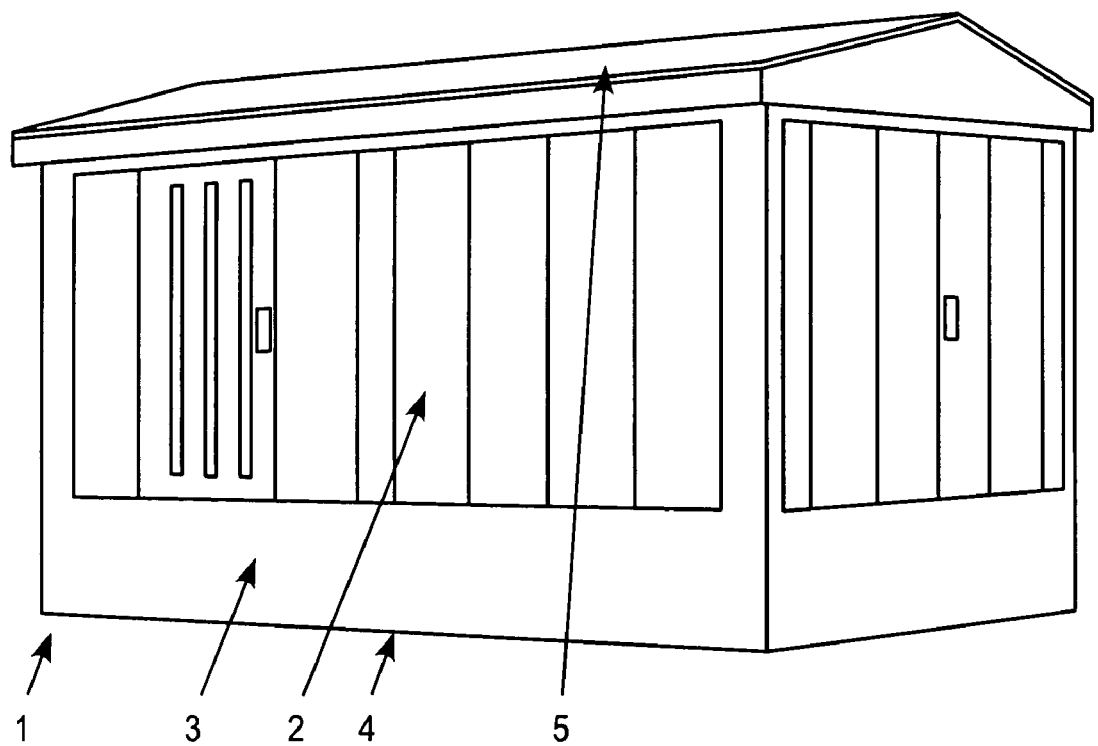

An exemplary method is disclosed for installation of a transformer station, the transformer station comprising a foundation plate and a building which is suitable to be positioned on said foundation plate. Further, the station comprises an electrical transformer which can be mounted on a supporting frame as part of the building. The foundation plate is provided with a docking station having a first electrical connector, and the building with the transformer is provided with a corresponding second electrical connector for connection with the first electrical connector. The foundation plate is previously transported to a transformer station site and installed, and cables from the electricity net are connected to the first electrical connector. The building is placed onto the foundation plate with the first and second electrical connectors which directly mate to each other, e.g., in an automatic way.

The building according to the disclosure comprises a transformer and a housing for the transformer. For example, the building comprises a frame, a trans-former on the frame, and a housing on the frame. After installation of the foundation, the frame and the transformer is mounted on the foundation, and the housing protecting the frame-mounted transformer from environment and malicious damage is finally lowered onto the frame-mounted part and fastened. Alternatively, the housing and the frame-mounted part, i.e. the building with its transformer supporting frame, can be mounted on the foundation as a single block.

An exemplary transformer station comprises a foundation plate and a building with a transformer positioned on top of the foundation plate, wherein the foundation plate is provided with a docking station comprising a first electrical connector, and wherein the building with the transformer is provided with a corresponding second electrical connector configured for direct mating, e.g., automatic mating, with the first electrical connector when the building is placed, for example by lifting, onto the foundation plate.

It has to be mentioned here that the term "a first connector" or "the first connector" has been chosen for the sake of simplicity, though the term also implies a plurality of first connectors, and that the term "a second connector" or "the second connector" also implies a plurality of second connectors. The plurality of first or second connectors is usually the case; however, the plurality of connectors, in this connection, is seen as one united connector.

By the method and apparatus according to the disclosure, the delivery of transformer stations is substantially rationalised, which is beneficial for the producer and for the client. For the producer, this implies that the foundation and the cable connection from the underground cables can be mounted to the foundation at the respective transformer station site, while the transformer with its corresponding electrical installations is assembled and mounted onto the frame of the building at the production site. These operations—performed by entirely different types of personnel—can thus be performed in parallel, which saves time beneficial for the producer as well as for the client.

In addition, the time it takes to mount the transformer on the foundation, once the foundation is in place, is very short. As the building with the transformer is transported to the transformer station site on a lorry, the required installation time is essentially the time it takes to lift the building onto the foundation plate. This is in contrast to prior art methods for installation, where the thick and stiff ground cables had to be inserted into corresponding entrance openings of the foundation plate and into the transformer station when the transformer station together with the foundation plate were placed on the ground at the transformer station site. According to the disclosure, the foundation plate can be installed a substantial time before the building with the transformer is delivered, for example days or weeks before.

The method and apparatus according to the disclosure are highly suitable for transformer replacement, wherein the installed transformer and the components coupled therewith, e.g. the building, are lifted off the foundation plate with an automatic release between the first and the second electrical connectors, and wherein a different building with a transformer is lifted onto the docking station with an automatic mating between the first electrical connector and the electrical connector of the new building when the new building is lowered onto the foundation plate. This operation can be performed very quickly, thus, consumers are without power supply only for a very few hours. Clearly, the former protecting housing is either lifted together with or separately from the former building depending on the way it is coupled with the building itself. Likewise, also the new housing will be placed on the foundation together with or separately from the new building depending on the way they are mutually coupled.

A docking station can be used for MV cables or for LV cables or both, or there can be provided a docking station for each.

In order to provide a proper connection between the first connector and the second connector with minimised risk for breakage due to sideways movements or imprecise lowering during installation of the building on the foundation plate, proper guiding means can be used. In another exemplary embodiment, the foundation plate is provided with first mechanical guiding means and the building be provided with corresponding second mechanical guiding means for guiding the movement of the building relative to the foundation plate when the first and the second guiding means are cooperating. In this case, it is an advantage that the first and the second mechanical guiding means are configured to cooperate at a placing distance, for example lifting distance, between the foundation plate and the building that is larger than the distance necessary to mate the first and the second electrical connectors. In other words, when the building with the transformer is lowered onto the foundation plate, the guiding means start cooperating first in order to provide a safe positioning of the building relatively to the foundation plate, and only after this initial cooperation of the guiding means, a connection can be made between the electrical connectors, where the transformer is connected to the ground cables installed in the docking station.

For example, the foundation plate is provided with male or female mechanical connectors as guiding means, and the building is provided with cooperating female or male mechanical connectors as guiding means, respectively. Alternatively or in addition, the mechanical connectors comprise profiles that extend in an upward direction from the foundation plate or the docking station or both. Further, these guiding means—which as stated above, for example, comprise profiles and/or pins engaging with corresponding recesses—may, optionally, act also as earth connection means, which solution is important for safety reasons. In fact, earth connection is established first during the lowering of the building onto the foundation plate by using guiding means longer than the electrical first and second connectors.

In order to protect the first electrical connectors of the docking station from unauthorised access, an exemplary docking station comprises a protective device, such as a shielding shutter arrangement. In a practical exemplary embodiment, the shutter arrangement has first mechanical activation means configured for opening the shutter when the first mechanical activation means are activated. Correspondingly, the building is provided with second mechanical activation means configured for automatic contact with the first mechanical activation means and activation thereof during lowering of the building onto the foundation plate. This aspect of the disclosure implies that no human action with manual interference is required during the mounting of the housing onto the foundation plate other than the lifting process in order that contact is achieved between the first connector and the second connector.

In an exemplary embodiment, the shutter arrangement comprises two shutter shells mounted rotatably around a rotation axis, for example horizontal rotation axis, for rotation in opposite directions. For example, the two shells are accommodated in a third, lower shell when the two shells are retracted in order to open the shield. A mechanical solution is provided, where each of the two shutters shells are rotatably connected to an upwardly extending bar, the two bars of the two shutters crossing each other and being rotatably connected at the crossing point and arranged for pressing the shells apart as a result of pressing the bars downwards. For example, a frame of the building with the transformer may press on the rollers of the arms, when the frame with the building and the transformer is lowered, for example by a crane. The pressing down of the rollers pushes the arms downwards in a scissor-like movement pressing the shutters away from each other to open for access to the first connector.

In order for the shutters to take up little space when pushed into an open position for the shield, each of the shutter shells may, advantageously, be provided as a plurality of sub-shells, for example in guided sliding engagement with each other.

A high degree of flexibility is achieved, if the foundation plate of the dock, which is basically formed by the foundation plate itself and the docking station, is built up of modules that are fastened to each other to form a rigid and solid plate. For example, the foundation plate can be assembled from a plurality of cuboid modules fixed to each other and forming a solid and static foundation plate.

By building a dock, whose foundation plate is composed by pre-fabricated cuboid modules, a great flexibility is achieved concerning the design of foundations with respect to different dimensions. In addition, if as mentioned above, a frame-mounted transformer, optionally, with the housing, is exchanged with a new frame-mounted transformer of different ratings due, for example, to other power requirements for the LV net, a modular foundation is extended in width or even in length by addition of further modules. In order to ease the extension in length, the MV section is kept in place, and the LV section is moved in accordance with the length extension. As an option, the cables of the LV section are, from the beginning, available with extra length in order to easily extend the connection in accordance with the extension of the foundation.

Thus, a change of the ratings of a frame-mounted transformer lead to the removal of a first frame-mounted transformer together with its associated housing, after which the foundation is adapted to the correct dimension by addition or removal of appropriate modules, and the new frame-mounted transformer is mounted onto the new adapted foundation plate (or dock) together with the appropriate housing. An exchange of the complete building including the foundation is no longer necessary, which is a great advantage. The result is reduced costs and quick installation. In addition, the entire former housing with the frame-mounted transformer can be reused at other locations with a likewise quick and easy installation.

The term cuboid is used for parallelepiped modules having 6 rectangular or likewise square plane faces. The term prefabricated means that the cuboid is fabricated prior to assembly of the foundation plate. The transformer station can be of various types; however the disclosure is directed especially to CSS.

In another exemplary embodiment, the foundation comprises a trench in one end of the foundation, and a central area of the foundation is built up of a first type of cuboid modules. The first type of cuboid modules may then advantageously be elongate and have a length L1 equal to the length W1 of the trench. Often, however, the foundation comprises a trench at each of the two opposite ends. In this case, likewise, the foundation area between the trenches is possible to be built up of a plurality of a first type of cuboid modules, the first type of cuboid modules being elongate and having a length L1 in the order of the length W1 of at least one of the two trenches or equal to the length W1 of at least one of the two trenches.

The foundation plate has a length L and a width W. If the width W of the foundation plate is larger than the length L1 of the first type of elongate cuboid modules, the foundation plate may, additionally, include a second type of cuboid modules, where the second type of cuboid modules are mounted to the ends of the first type of cuboid modules in order to form the desired width W of the foundation plate. The second type of cuboid modules can have a length L2 substantially shorter than the first type of cuboid modules of the foundation.

As this second type of cuboid modules form the longitudinal sides of the foundation, the longitudinal sides can be extended with further cuboid modules of the second type to form the end walls for the trenches at the ends of the foundation. Alternatively, the longitudinal sides are extended with further cuboid modules of a third type of cuboid modules to form end walls for the trenches at the ends of the foundation; the third type of cuboid modules is different from the second type of cuboid modules, for example shorter.

In a practical exemplary embodiment, in order to mount the cuboid modules together, the cuboid modules have grooves in their sides, and a corresponding plug is used for binding two adjacent grooves together. For example, if the grooves are T-formed or substantially T-formed, the plugs are correspondingly H-formed or substantially H-formed. One alternative to the T-formed grooves are trapezoidal, whereas the plugs have a correspondingly double-trapezoidal cross section for fitting into two adjacent trapezoidal grooves. Other types of grooves can be used for assembly. Using a groove and plug assembly eases the production of foundations relative to a mounting, where the cuboid modules are screwed together by suitable bolts, though this is also an option.

In order to get a tight and stable connection between the cuboid modules, the grooves or the plugs, or both may advantageously have a slight wedge-like inclination along the vertical direction in order to reduce the tolerances between the plug end the groove in dependence of the insertion depth of the plug into the groove. A proper and deep insertion of a plug in a groove then provides mutual stress between the groove and the plug.

A possible material for the modules of the foundation is concrete, preferably with steel reinforcement. Another possibility among a variety of applicable materials is fibre reinforced polymer.

Figure 1B:
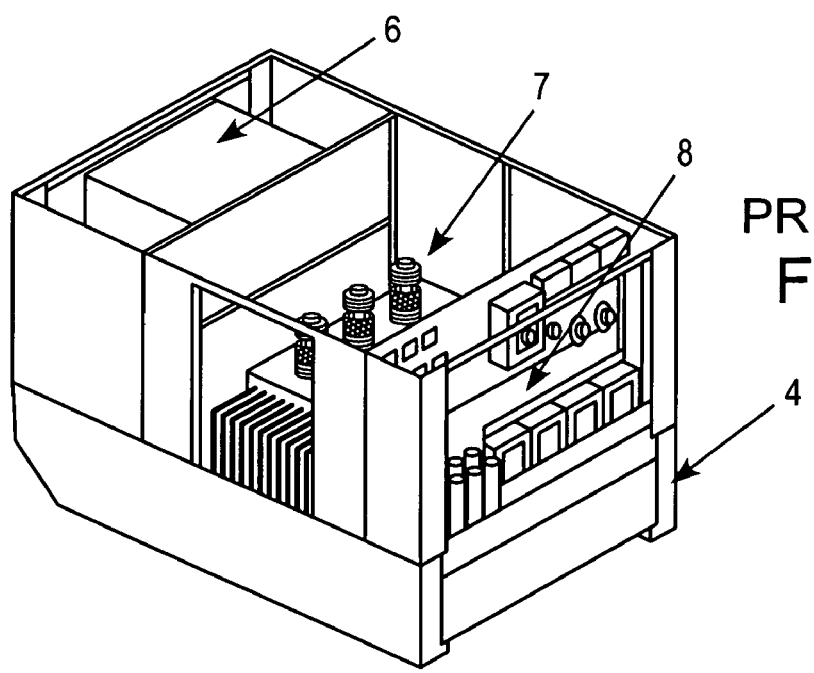

FIG. 1a and FIG. 1b illustrate prior art CSSs. In FIG. 1a, a CSS 1 is illustrated, with roof 5 and side walls 2 resting on a lower wall part 3 which covers the foundation 4. Typically, a CSS is delivered in one unit as illustrated in FIG. 1b showing the foundation 4 on which there is mounted an MV section 6 receiving electricity from the MV net, the transformer 7 and the LV installation 8 with its switches and fuse systems.

Figure 2A:
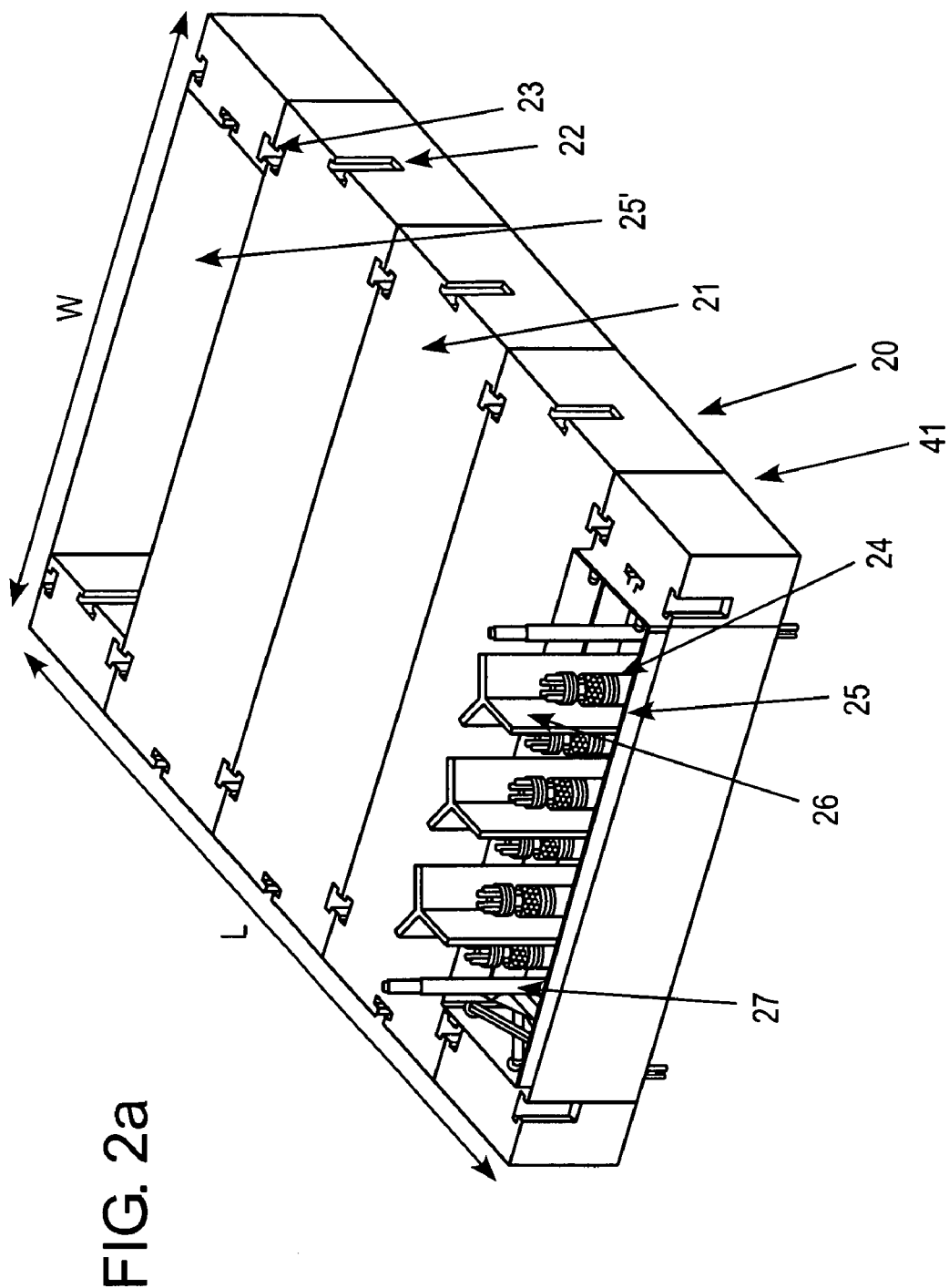

FIG. 2a illustrates in a three dimensional sketch a foundation plate 20 built up of modules 21 having T-formed grooves 22 for connection by using an H-formed plug 23, which is illustrated in greater detail in FIG. 8. The foundation plate comprises a docking station 41 having first electrical connectors 24 positioned in a trench 25. Longer than the connectors are first guiding means for example in the form of profiles 26 and pins 27. If a building with a transformer is lowered by a crane on top of the foundation plate 20, the building has to match with the first guiding means first, before the building can be lowered down to the electrical connectors, which is a safety mechanism preventing mechanical overload to the electrical connectors and preventing a misconnection, where first connectors 24 from the foundation plate are not correctly connected to the corresponding second connectors in the building with the transformer. The sketch of FIG. 2a is shown in a top view in FIG. 2b. The foundation plate 20 may, in addition, be provided with a further trench, 25', which is used for LV cable connections.

Figure 3A:
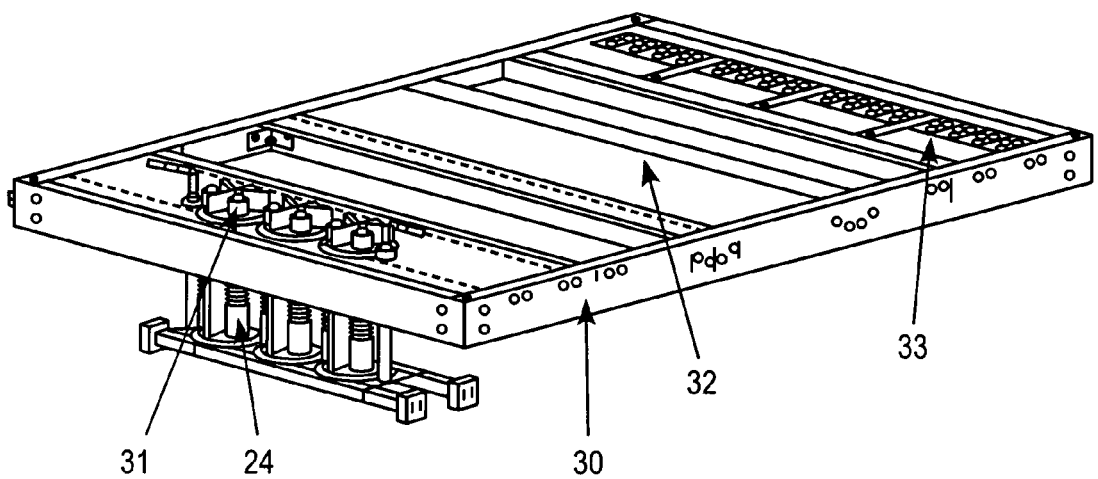
Figure 3B:
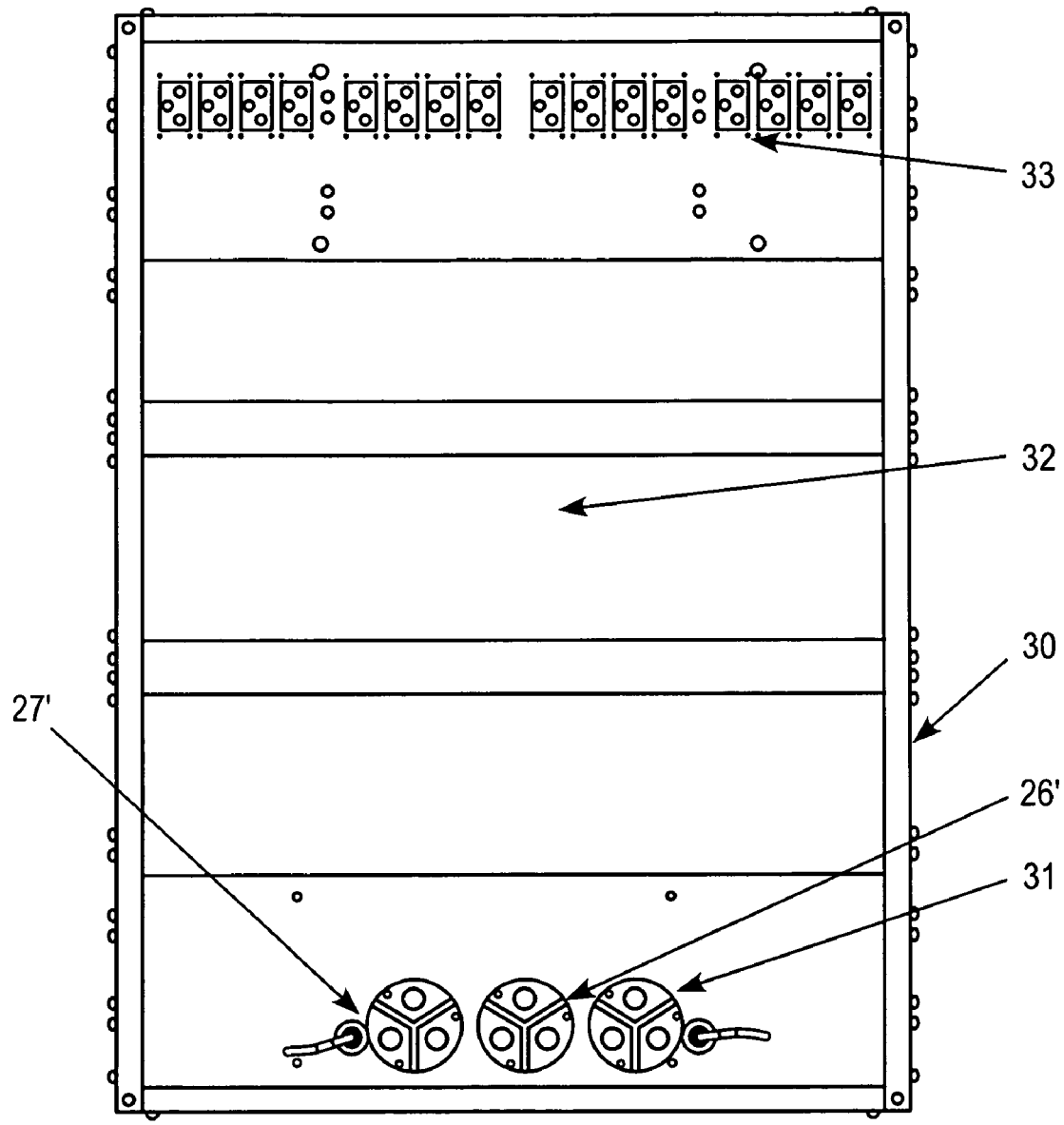

FIG. 3a is an illustration of the lowest part of the building which comprises a frame 30 where connection is made between the first electrical connectors 24 of the foundation and the second connectors 31 operatively associated with in the frame 30 of the building. FIG. 3b is a corresponding top view of the frame 30 indicating the first guiding means in the form of profiles 26 and pins 27 inside second guiding means in the form of recesses 26' and holes 27'. The area with the second connectors 31 is the MV region. The electrical transformer is mounted on and in the middle 32 of the frame 30 according to solutions which are well known in the art and therefore neither illustrated nor described herein in further details. In addition, the building can comprise several other components not shown hereby, since they are not necessary for the description and understanding of the present disclosure. The opposite end 33 is devoted to the LV region with all its installation with switches and fuses. Though a connector arrangement is only shown for the MV region, a likewise arrangement is possible for the LV region.

Figure 4B:
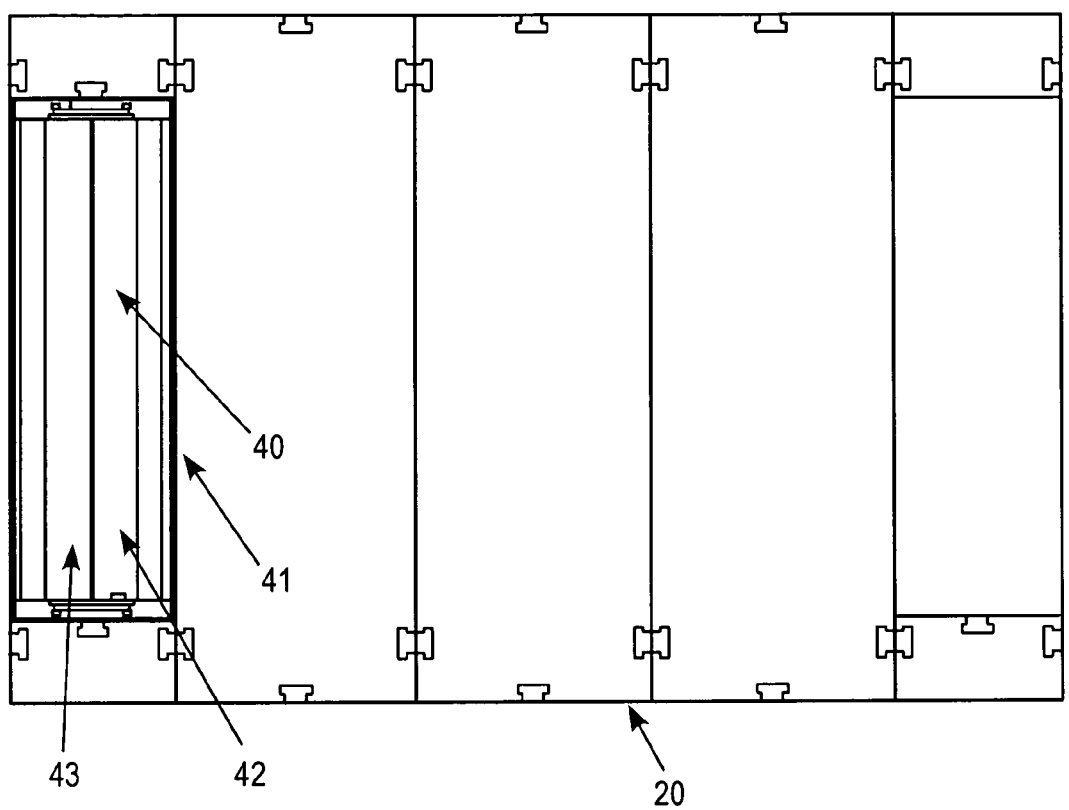
FIG. 4 a-c show different views illustrating a docking station according to the disclosure.
Figure 4C:
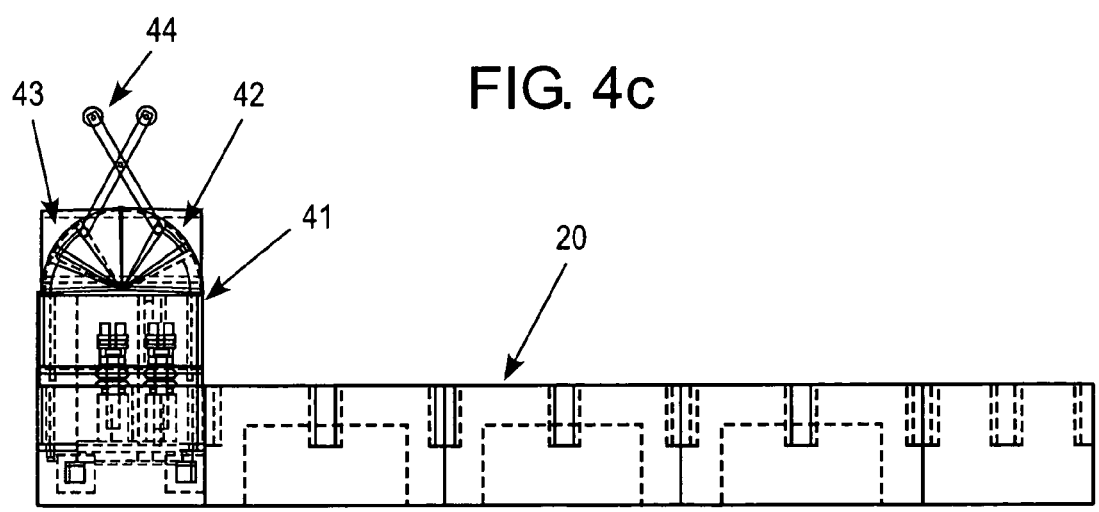

FIG. 4a illustrates a modular foundation 20 where the electrical connectors are protected by a shield 40 in a docking station 41. In FIG. 4b and in FIG. 4c, the two shells 42, 43 of the shield 40 of the docking station 41 are shown in a top view and in a transparent side view, respectively.

Figure 5A:
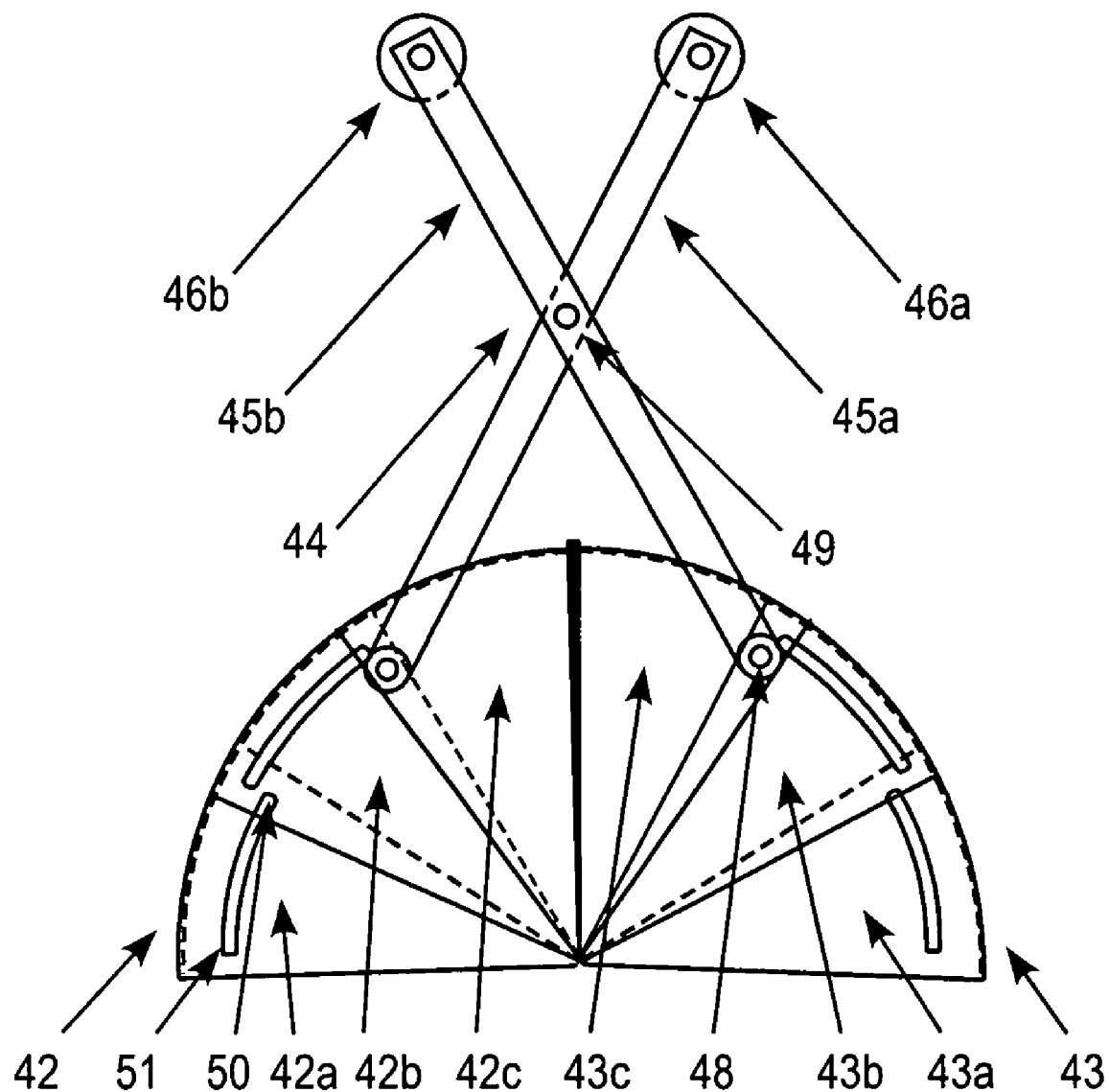
FIG. 5 a-c show different views illustrating the shells of the docking station according to the disclosure.
Figure 5B:
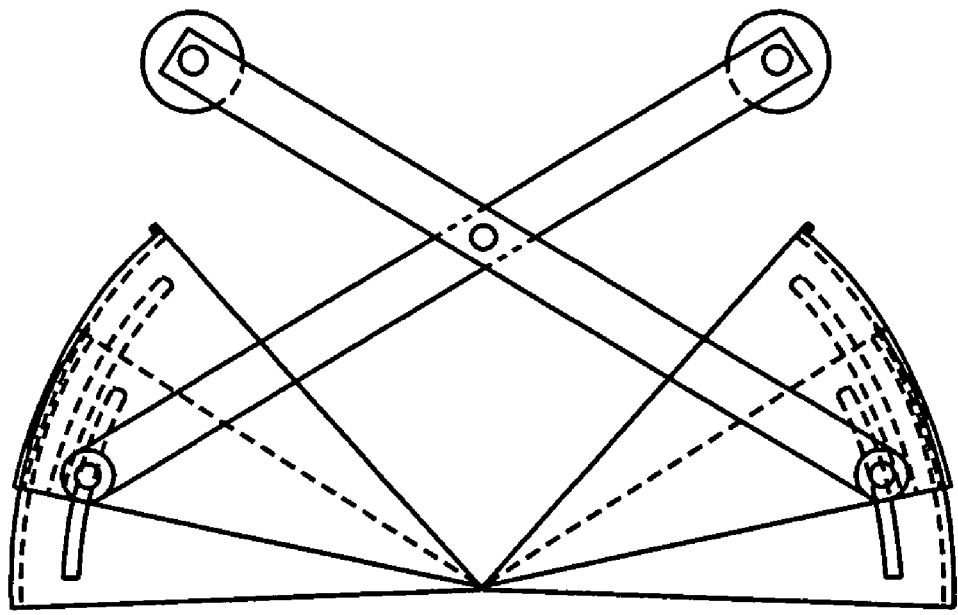
Figure 5C:
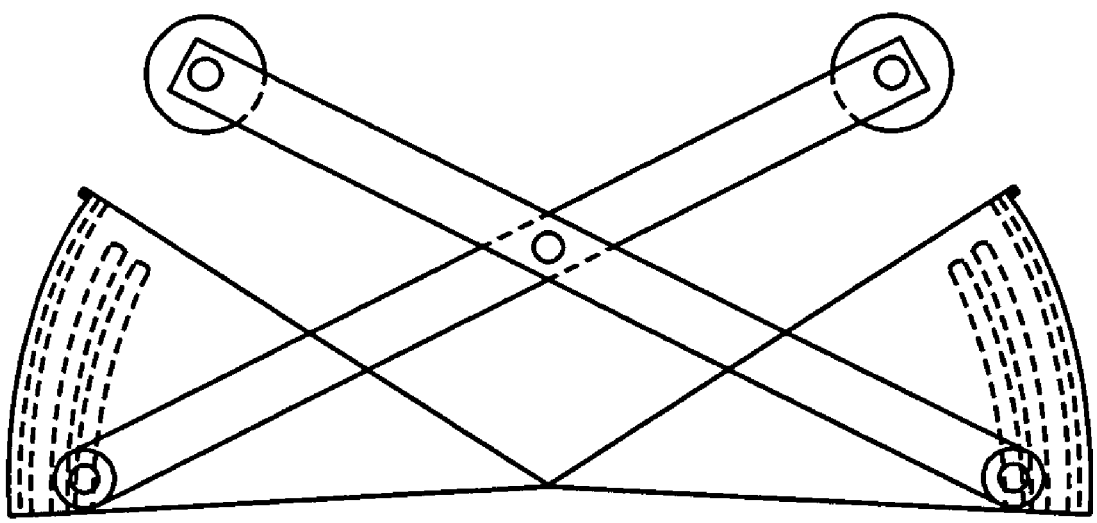

Each of the shells 42, 43 is connected to an arm to form a scissor like arm arrangement 44, which is shown in greater detail in FIG. 5a and FIG. 5b in a side view. With reference to FIG. 5a, the scissor like arm arrangement 44 comprises two arms 45a and 45b mutually connected by a rotational connection 49 and each connected to a shell 42, 43 by a further rotational connection 48. The arms 45a and 45b are provided with rollers 46a and 46b at their upper ends and form first activation means. When these rollers 46a and 46b are pressed downwards by corresponding second activation means in or on the frame or as part of the frame, the rotational connection 49 forces the arms 45a, 45b into a scissor movement which pushes the shells 42 and 43 in opposite directions. In order to save space for the shells 42, 43, each of these shells are made of three sub-shells 42a, 42b, 42c and 43a, 43b, 43c, respectively. The movement of the sub-shells is illustrated in greater detail in FIGS. 5b and 5c for two different positions of the rollers 46a, 46b and orientation of the arms 45a, 45b and thereto connected sub-shells 42a, 42b, 42c and 43a, 43b, 43c. Each of the upper two sub-shell 42a, 42b, 43a, 43b comprises a pin 50 sliding in a recess 51 in the lower two shells 42b, 42c, 43b, 43c as a guiding means for the motion.

Figure 6A:
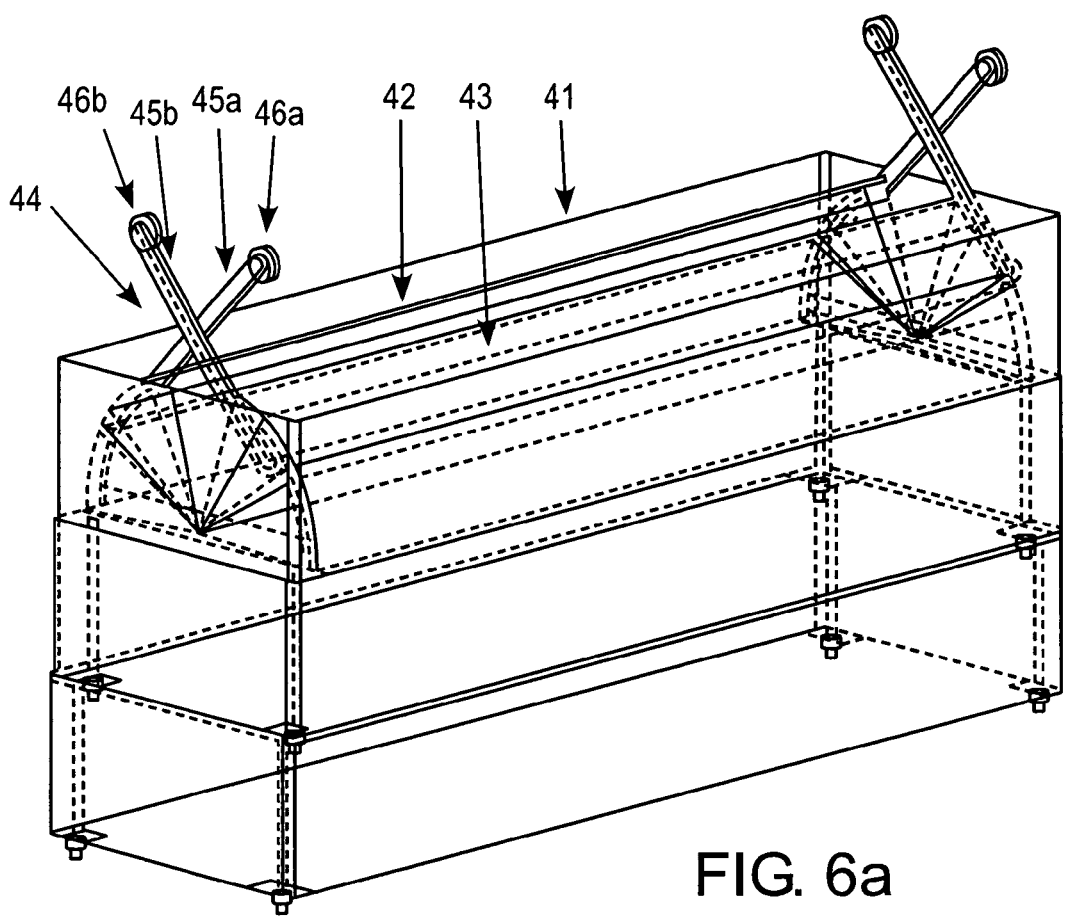
FIG. 6 a and b are transparent detailed views of the docking station with the shells.
Figure 6B:
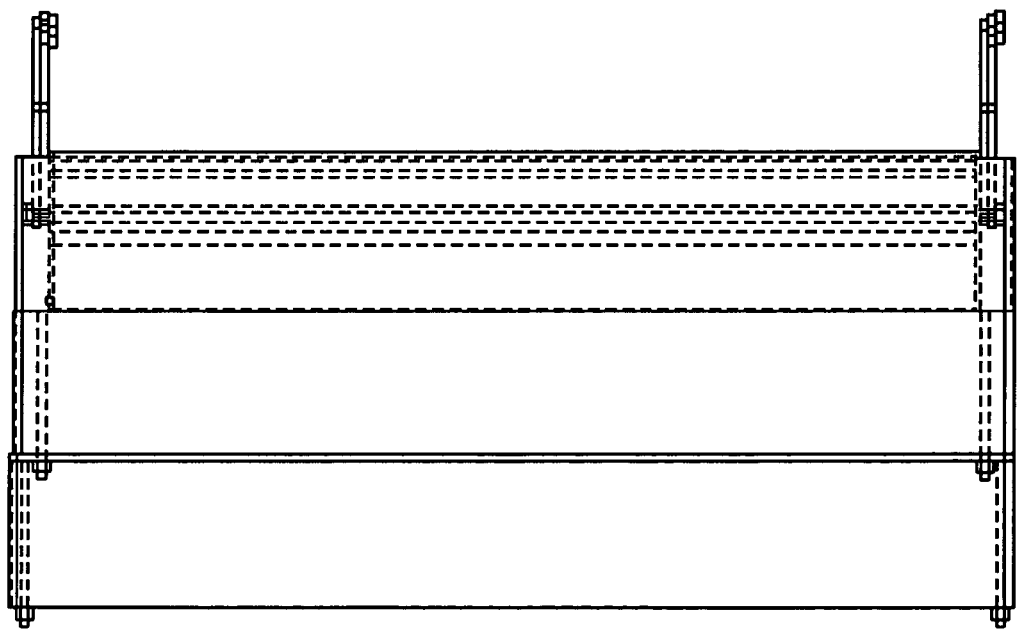

FIG. 6a illustrates the scissor like arm arrangement 44 of the docking station 41 with the shells 42, 43 and the arms 45a, 45b in a transparent perspective and in FIG. 6b in a side view.

Figure 7:
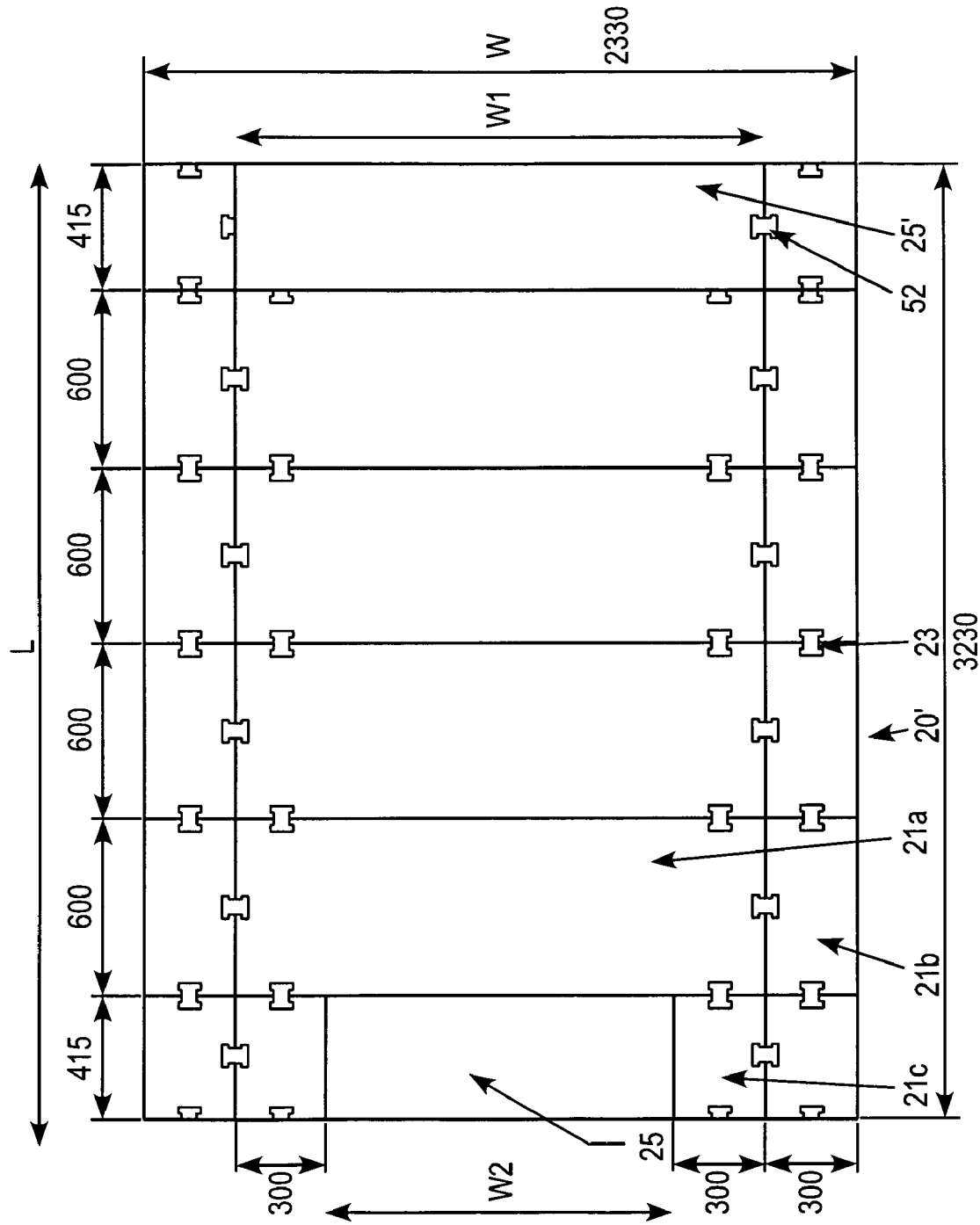
FIG. 7 shows an alternative modular foundation.

FIG. 7 illustrates an alternative modular foundation plate 20', which can be regarded as an extension relative to the foundation plate 20 as illustrated in FIG. 2. The foundation plate 20' of FIG. 7 is a solid and static plate formed by a number of modules that are attached to each other. The relatively long modules 21a are used as the central modules, the number of which determines the length L of the plate 20'. On the side of the long modules 21a, the smaller modules 21b, are used to extend the foundation plate 20' to the desired width W. Also, as shown in the left part of FIG. 7, modules of a third type 20c are used to adjust the widths, W1, W2 of the trenches 25', 25 in the ends of the foundation plate 20'. Indicated dimensions are for illustration only and do not limit the disclosure in any way.

Figure 9A:
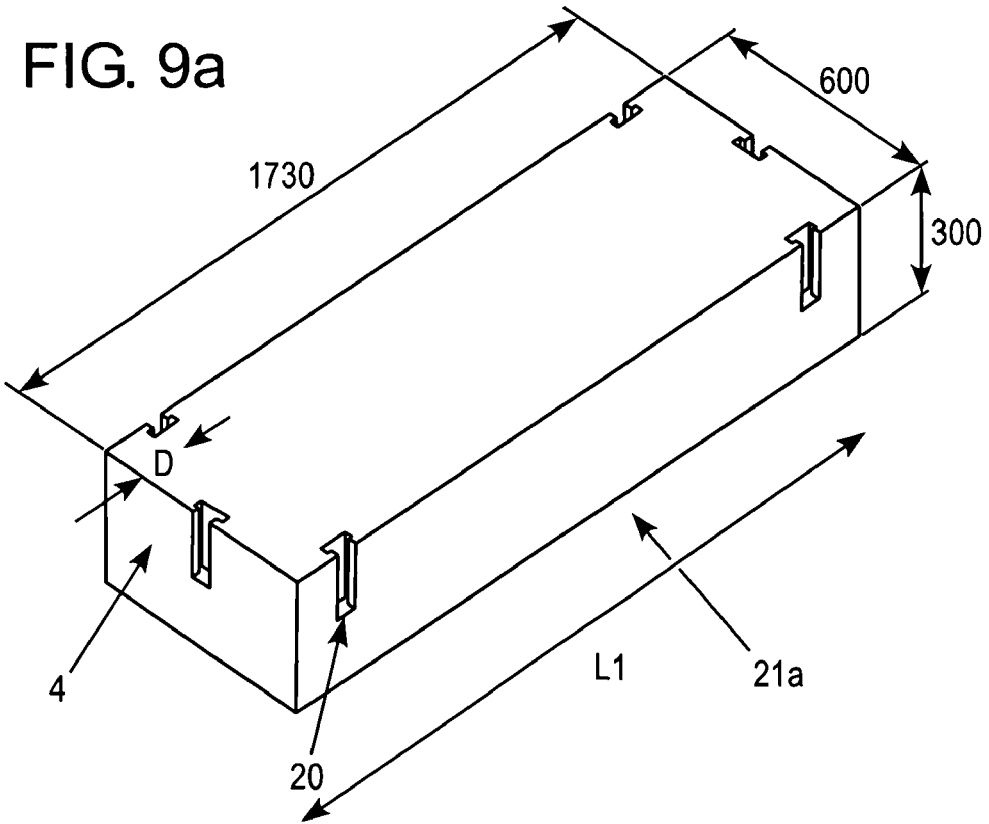
Figure 9B:
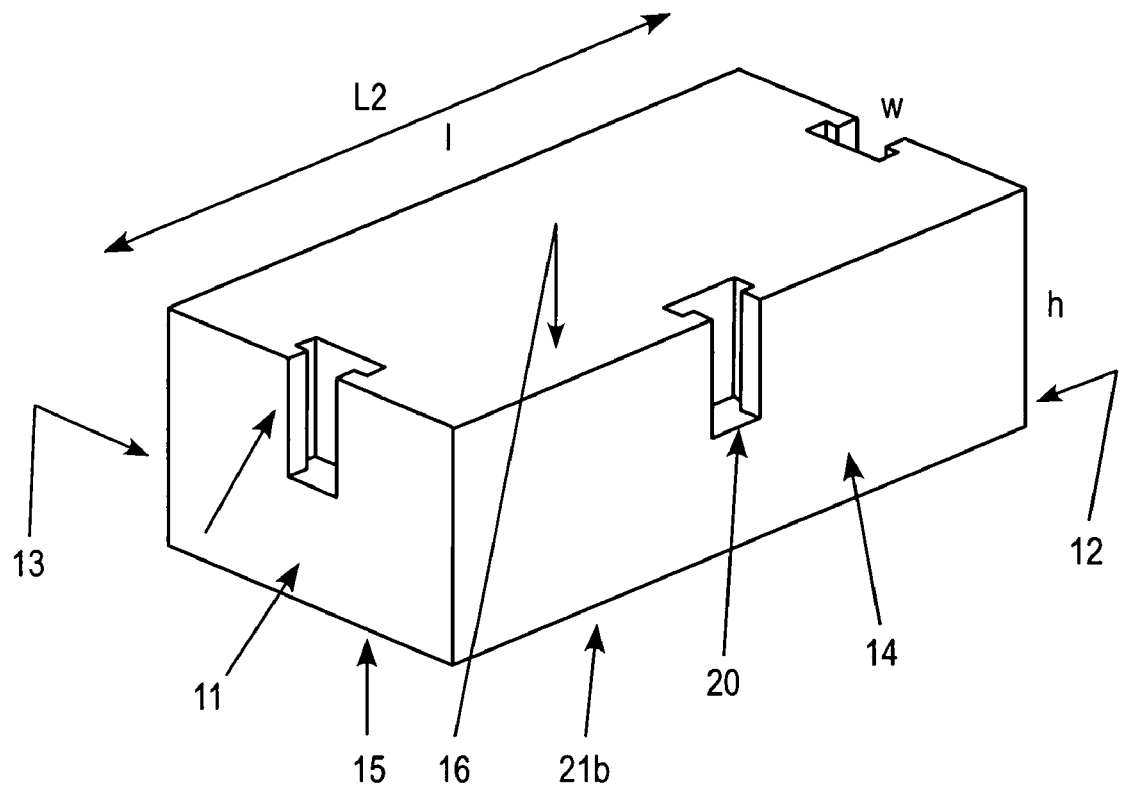

FIG. 9 illustrates the three modules 21a, 21b, and 21c in greater detail, wherein module 21a has a length L1 longer than the length L2 of module 21b. As illustrated in FIG. 9b as a general example for a cuboid module, the module 21b comprises in a first face 61 and a second face 62 which are substantially parallel to each other and are spaced apart by a distance l, which defines the length of the module 21b; it comprises a third face 63 and a fourth face 64 which are substantially parallel to each other and are spaced apart by a distance w, which defines the width of the module 21b; and it comprises a fifth face 65 and a sixth face 66 which are substantially parallel to each other and are spaced apart by a distance h, which defines the height of the module 21b. The parameters l, w, and h are indicated in FIG. 9b for illustration and are general for cuboid modules.

Figure 8A:
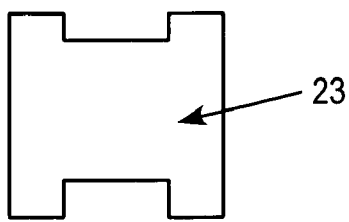
FIG. 8 a) illustrates an H-formed plug and b) illustrates an H-formed plug with a wedge-like shape, FIG. 9 a-c illustrate different types of modules
Figure 9C:
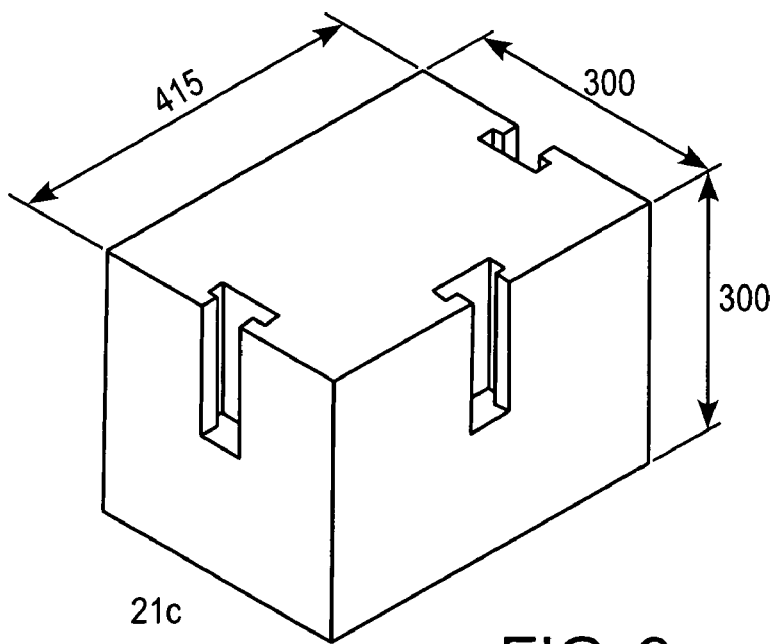

The cuboid modules 21a, 21b, 21c are assembled by connecting grooves 52 in the side of the cuboid modules 21a, 21b, 21c. The grooves 52, as illustrated in FIG. 9, are T-formed, and when two cuboid modules are placed adjacent to another, an H-formed plug 23, as illustrated in FIG. 8a, is inserted into the adjacent grooves 52 holding the cuboid modules 21a, 21b, 21c together after insertion, as illustrated in FIG. 7. As it appears from the various cuboid modules illustrated in FIGS. 9a, 9b and 9c, the smaller cuboid modules 21b, 21c have grooves 52 on three sides, though it is also possible to provide cuboid modules with grooves 52 on all four sides 61, 62, 63, 64. The long cuboid modules 21a may have grooves 52 only near the ends 53, as illustrated in FIG. 9a. For example, the grooves 52 on the long sides 64 have a distance D1 from the end 53 of the cuboid module 21a, which is less than the width D2 of the cuboid module 21a.

Dimensions shown are only examples and are not limiting the disclosure. In addition, the drawings are not to scale.

Figure 10:
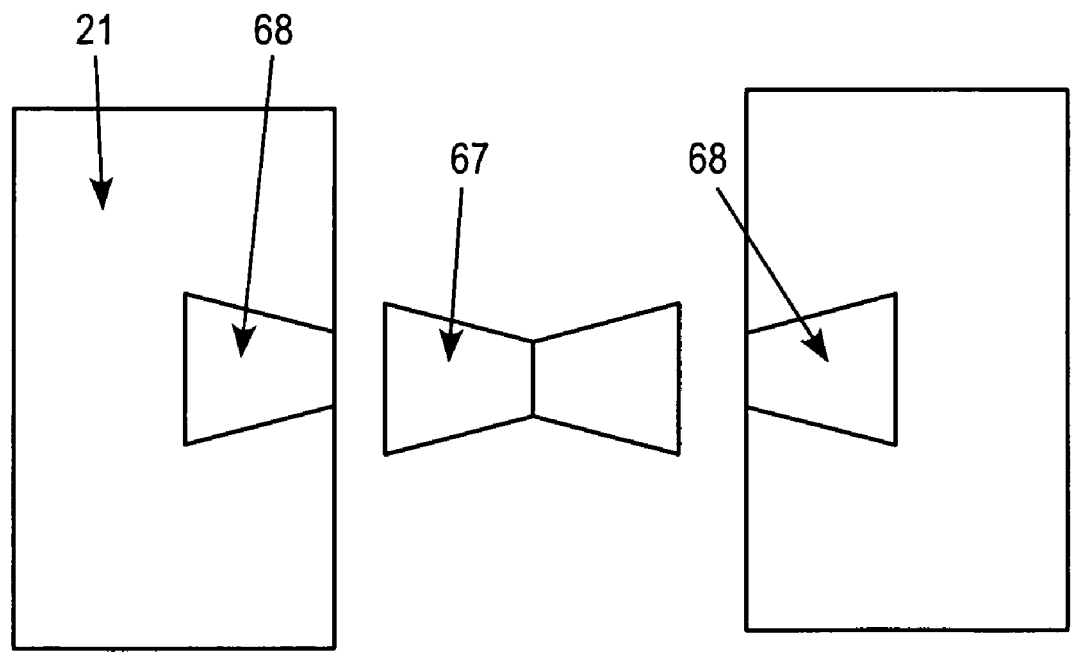
FIG. 10 shows a trapezoidal plug and groove combination.

In FIG. 10, an alternative groove and plug combination is shown, where the groove 68 in a module 21' (only illustrated stylistically) has a trapezoidal cross section and the plug 67 is substantially doubled trapezoidal to fit into the groove 68 of the cuboid modules 21.

In another exemplary embodiment, the plug and grooves according to the disclosure art formed with a slight inclination along the vertical direction in order to reduce the tolerances between the plug end the groove in dependence of the insertion depth of the plug into the groove. This is generally applicable for the variety of possible plugs and grooves in a modular foundation according to the disclosure. This is illustrated in FIG. 8b for the H-formed plug of FIG. 8a and for a trapezoidal plug in FIG. 11, which, however, is not limiting this principle to these two examples but applies equally well for other varieties.

Figure 11:
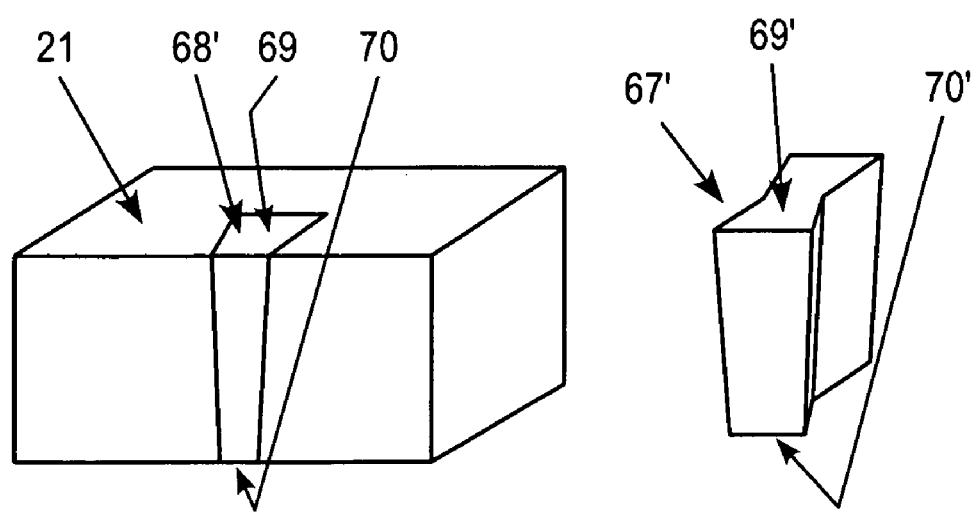
FIG. 11 shows a wedge-like trapezoidal plug and groove combination.

In FIG. 11, the plug 67' is double trapezoidal and the groove 68' is trapezoidal. As can be seen in FIG. 11, the width of the trapezoidal groove 68' and the width of the plug 67' is larger at the upper end 69, 69' than at the lower end 70, 70'. The wedge-like inclination of the plug 67' and the groove 68' provides mutual stress between the groove 68' and the plug 67' when the plug 67' is properly inserted into the groove 68'.

Figure 8B:
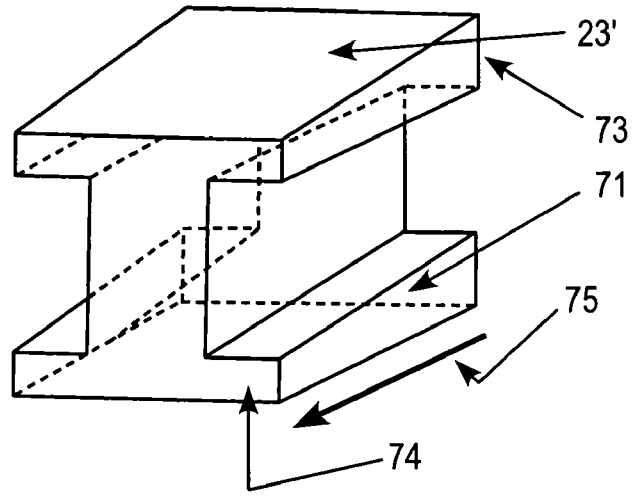

Likewise, the H-formed plug 23' in FIG. 8b has an inclination such that the side arms 71 decrease in width with distance (indicated by arrow 75) from the top 73 of the plug towards the bottom 75 of the plug 23.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for installation of a transformer station, the transformer station comprising a foundation plate and a building with a transformer which is suitable to be positioned on top of the foundation plate, the method comprising:
   providing said foundation plate with a docking station having a first electrical connector;

providing said building with a corresponding second electrical connector for connection with the first electrical connector;

providing a frame at a base of the building, the second electrical connection being arranged on the frame; and placing said building onto the foundation plate with said first and second electrical connectors directly mating to each other.

2. A method according to claim 1, wherein the said first and second electrical connectors are automatically mating to each other during the placing of the building.

3. A method according to claim 1, comprising pre-installing the foundation at the installation site and providing a connection from an electricity network to said first electrical connector, before placing the building on the foundation plate.

4. A method according to claim 1, comprising lifting off the placed building from the foundation plate with a release between the first and the second electrical connector, and placing a different building with a corresponding second electrical connector onto the foundation plate with said first connector and said corresponding second connector mating to each other.

5. A method according to claim 4, wherein said first electrical connector and corresponding second electrical connectors are automatically mating to each other during the placing of the building.

6. A transformer station comprising a foundation plate and a building with a transformer positioned on top of the foundation plate, wherein said foundation plate is provided with a docking station comprising a first electrical connector, and wherein the building with the transformer is provided with a corresponding second electrical connector configured for directly mating with the first electrical connector when the building is placed onto the foundation plate, and a frame at a base of the building, the second electrical connection being arranged on the frame.

7. A transformer station according to claim 6, wherein the building is provided with a corresponding second electrical connector configured for automatic mating with the first electrical connector during placement of the building onto the foundation plate.

8. A transformer station according to claim 6, wherein the foundation plate is provided with first mechanical guiding means and the building is provided with cooperating second mechanical guiding means for guiding the movement of the building relative to the foundation plate when the building is placed onto the foundation plate, wherein the first and the second mechanical guiding means are configured to cooperate at a placing distance between the foundation plate and the building that is larger than the distance necessary to mate the first and the second electrical connectors.

9. A transformer station according to claim 8, wherein the foundation plate is provided with male or female mechanical connectors as first guiding means and the building is provided with cooperating female or male mechanical connectors as second guiding means, respectively.

10. A transformer station according to claim 8, wherein the first mechanical guiding means are electrical earth connections.

11. A transformer station according to claim 6, wherein the foundation plate is assembled from a plurality of modules connected to each other and forming a solid and static foundation plate.

12. A transformer station according to claim 6, wherein the docking station further comprises a shielding mechanism for shielding the first electrical connector when the first connector is not connected to said building.

13. A transformer station according to claim 12, wherein the shielding mechanism comprises a shutter arrangement with first mechanical activation means configured for opening the shutter when the first mechanical activation means are activated, wherein the building is provided with second mechanical activation means configured for contact with the first mechanical activation means and contact thereof during lowering of the building onto the foundation plate.

14. A docking station for a transformer station of the type comprising a foundation plate and a building with a transformer positioned on top of the foundation plate, wherein the docking station comprises a first electrical connector configured for directly mating with a corresponding second electrical connector of said building with the transformer when the building is placed onto the foundation plate, the docking station further comprising a shielding mechanism for shielding the first electrical connector when the first connector is not connected to said building.

15. A docking station according to claim 14, wherein the shielding mechanism comprises a shutter arrangement with first mechanical activation means configured for opening the shutter when the first mechanical activation means are activated, wherein the building is provided with second mechanical activation means configured for contact with the first mechanical activation means and contact thereof during lowering of the building onto the foundation plate.

16. A docking station according to claim 15, wherein the shutter arrangement comprises two shutter shells mounted rotatably around a rotation axis for rotation in opposite directions.

17. A docking station according to claim 16, wherein each of the two shutters shells are rotatably connected to an upwardly extending bar, the two bars of the two shutter shells crossing each other and being rotatably connected at the crossing point and arranged for pressing the shells apart as a result of pressing the bars downwards.

18. A docking station according to claim 16, wherein each of the shutter shells is provided as a plurality of sub-shells in guided sliding engagement with each other.

\* \* \* \* \*